United States Patent

[11] 3,616,022

| [72] | Inventor | Michael Somerville Withers<br>Landenberg, Pa. |
|---|---|---|
| [21] | Appl. No. | 750,558 |
| [22] | Filed | Aug. 6, 1968 |
| [23] | | Division of Ser. No. 657,380, July 31, 1967, Pat. No. 3,435,893 |
| [45] | Patented | Oct. 26, 1971 |
| [73] | Assignee | E. I. du Pont de Nemours and Company<br>Wilmington, Del. |

[54] METHOD OF MAKING HEAT EXCHANGE COMPONENTS
5 Claims, 14 Drawing Figs.

[52] U.S. Cl. ................................................ 156/250,
156/275, 156/285, 156/296, 156/306, 156/312
[51] Int. Cl. ................................................ B32b 31/00
[50] Field of Search ........................................... 156/83,
196, 198, 228, 275, 296, 306, 187, 189, 191, 195, 250

[56] References Cited
UNITED STATES PATENTS

| 2,992,516 | 7/1961 | Norton | 156/296 X |
| 2,992,956 | 7/1961 | Bazinet | 156/296 X |
| 2,996,419 | 8/1961 | Schmick | 156/296 X |
| 3,004,368 | 10/1961 | Hicks | 156/296 X |
| 3,329,271 | 7/1967 | Ward et al. | 156/296 X |
| 3,341,730 | 9/1967 | Goodrich et al. | 156/296 X |
| 3,391,050 | 7/1968 | Nebesar | 156/296 X |

*Primary Examiner*—Carl D. Quarforth
*Assistant Examiner*—Stephen J. Lechert, Jr.
*Attorney*—Harry E. Braddock ABSTRACT: A method of fabricating assembly components for heat exchangers comprising: forming a single layer warp of a plurality of side-by-side continuous flexible hollow tubes made of an organic polymeric composition, constraining the warp laterally at a given portion along its length so that the tubes engage in each other laterally, applying a clamping force to the tubes at such portion across the width of the warp to move the engaged portions of the tubes into further engagement with each other; while maintaining such pressure, heating the tubes at such pressure to above the softening point of the polymeric material and concurrently applying sufficient pressure differential across the tube walls to expand the tubes into engagement with each other to form an integral molded structure extending transversely across the warp having passageways therethrough communicating with the interior of the tubes at each end of the molded structure; removing said clamping force; and removing the molded structure from such position.

INVENTOR
MICHAEL SOMERVILLE WITHERS

BY Harry E. Braddock
ATTORNEY

INVENTOR
MICHAEL SOMERVILLE WITHERS

BY

ATTORNEY

INVENTOR
MICHAEL SOMERVILLE WITHERS

BY

ATTORNEY

PATENTED OCT 26 1971 3,616,022

INVENTOR
MICHAEL SOMERVILLE WITHERS

BY

ATTORNEY

INVENTOR
MICHAEL SOMERVILLE WITHERS

BY

ATTORNEY 3,616,022

METHOD OF MAKING HEAT EXCHANGE COMPONENTS

This is a divisional application based on application Ser. No. 657,380, filed July 31, 1967 now U.S. Pat. No. 3,435,893.

CROSS-REFERENCE TO RELATED APPLICATIONS

U.S. Pat. No. 3,315,740 to M. S. Withers, filed Jan. 14, 1965, issued Apr. 25, 1967 U.S. Pat. No. 3,228,456 to Brown et al., filed Mar. 1, 1965, issued Jan. 11, 1966 U.S. Pat. No. 3,277,959 to M. S. Withers, filed Aug. 12, 1965, issued U.S. Pat. No. 3,417,812 to R. D. Smith, filed Nov. 30, 1966 U.S. Pat. No. 3,419,069 to Baker et al., filed Apr. 28, 1967.

This invention relates generally to heat exchange, or heat transfer, apparatus; and more specifically to a method for forming a particular heat exchange apparatus from flexible plastic tube elements.

It is an object of the invention to provide a method for forming a simplified, novel, and improved structure from flexible plastic hollow tube elements which is suitable for performing a heat transfer function in a heat transfer apparatus or process involving a plurality of fluids. It is an object of the invention to provide a method for forming a structure which is simple and economical in its construction, yet effective and reliable in use, such structure also being capable of convenient expeditious fabrication and assembly into composite heat transfer, or heat exchange, apparatus units.

It is a further object to provide a method for forming a structure which in its features, its functioning, and its manufacture overcomes certain disadvantages and problems involved in prior art heat exchange structures of the type utilizing flexible plastic tube elements as will be discussed hereinafter.

Other objects and advantages will appear from a consideration of the following specification, claims, and accompanying drawings.

BACKGROUND OF THE INVENTION

As indicated in U.S. Pat. Nos. 3,315,740; 3,228,456, and 3,277,959, heat transfer processes and apparatus utilizing flexible plastic tubular elements are known, and because of the use of this type tubular elements, a number of special problems have been faced in designing, producing, and operating such arrangements.

In one of these arrangements, the flexible plastic tube elements must be individually threaded through baffle members and secured individually in tube sheet members. In other of these arrangements, the tube elements are fashioned into bundles using transverse tapes which must be secured to the tube elements by welding or adhesives. In still other arrangements (U.S. Pat. No. 3,417,812 filed Nov. 30, 1966), additional means such as foraminous cylinders, or baskets, are needed in addition to the tapes to maintain the position and size of a bundle of heat exchange tubes. Bundles of flexible plastic tubes also have been formed by assembling sleeves of braided tubes in order to provide coherent stale bundles (U.S. Pat. No. 3,419,069 filed Apr. 28, 1967). These previous arrangements are somewhat complex, costly, and involve certain problems in operation and maintenance.

The components of this invention, due to their simplicity, no additional elements being required, in the preferred version, other than the flexible plastic tube elements themselves, and due to the ease of assembly into composite heat exchanger units, presents an improved product over the prior art arrangements and also makes possible the use of more simple and efficient production techniques. The improved component, due to its novel construction, can be used to produce special configuration heat exchanger units reduced in one of their three dimensions for use in special limited space applications. The elimination of tapes, and braids, and supporting baskets in the preferred embodiments of the invention not only reduces complexity and cost, but also improves fluid flow characteristics by reducing pressure drop and reducing susceptibility to clogging due to foreign matter in the fluid streams being handled exteriorly of the hollow tubular elements.

The improved component when used in a flat warp configuration of the tube elements, or in a rectangular transverse cross section multilayer assembly is especially advantageous in heat exchangers of the "cross flow" type in which one fluid stream is passed substantially perpendicularly, or transversely, across a bundle of tube elements carrying another fluid stream for heat transfer between the streams.

The advantages and features mentioned generally in the preceding paragraphs will be discussed in detail hereinafter.

Figure 10:
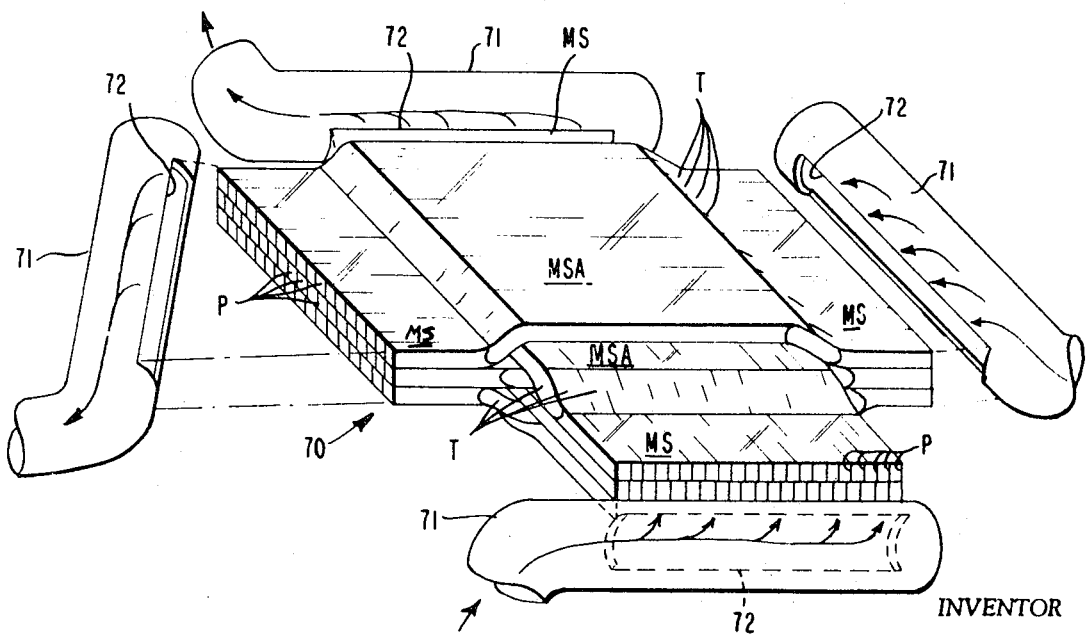

FIG. 10 is an exploded perspective view of an assembled heat exchange unit utilizing components of this invention which have the transverse molded or united structure formed not only across the terminal portion of the tube elements to facilitate connection to the header members, but also across intermediate portions of the tube elements to provide for heat transfer between alternate layers of the tube elements without the need for the usual shell or casing.

Figure 11:
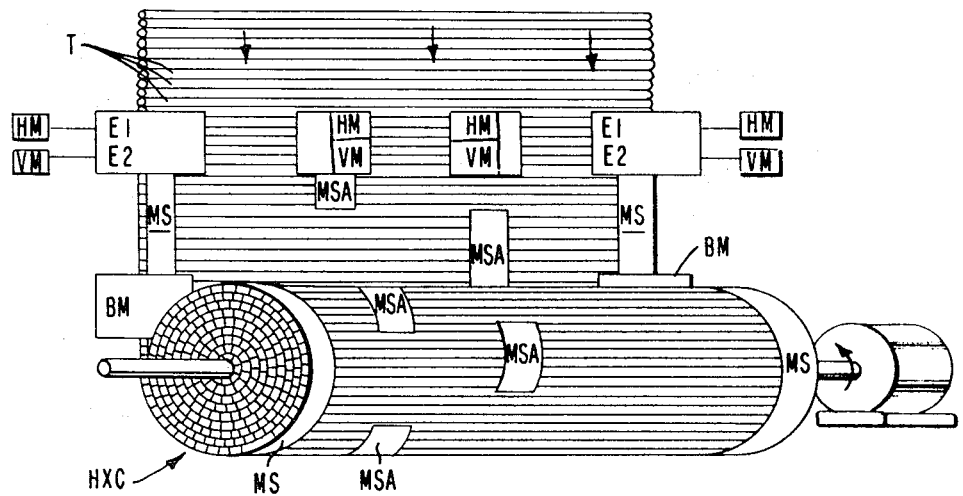

FIG. 11 is a generalized schematic showing of another arrangement for producing components embodying principles of this invention and assembling the components into a multilayer bundle.

Figure 12:
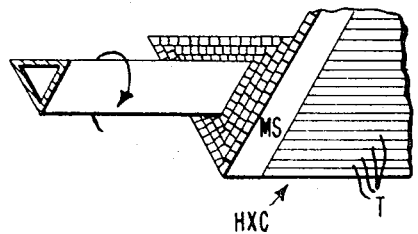
Figure 13:
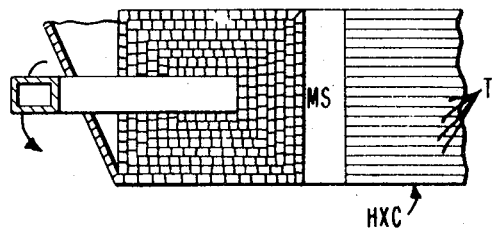

FIGS. 12 and 13 shown multilayer bundles of different transverse cross sections which can be prepared by the arrangement of FIG. 11.

Figure 3:
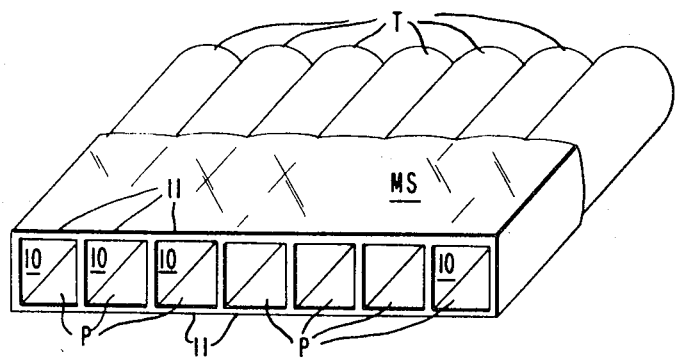
FIG. 3 is a view similar to FIG. 2 showing the united tube elements of the component of this invention.
Figure 6:
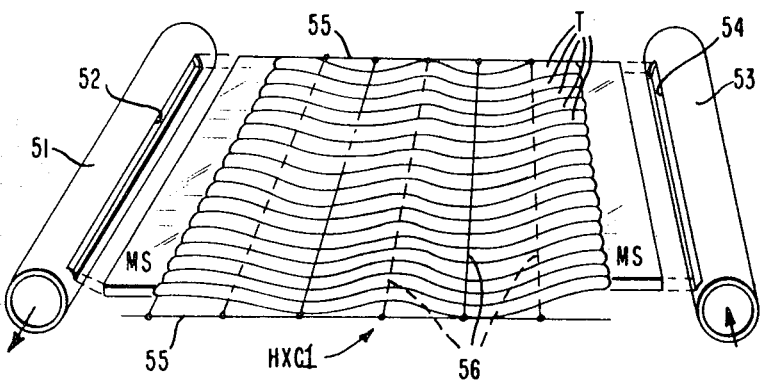
FIG. 6 is a perspective exploded view of a simplified heat exchange unit formed using a single component of this invention.
Figure 9:
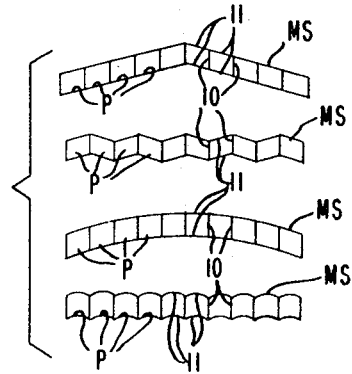
FIG. 9 is a series of schematic views of components of the invention showing a number of the possible transverse cross-sectional arrangements of the united molded structure which would permit assembly by stacking or winding up of components.

The basic structure of an assemblable component embodying principles of the invention is shown in FIG. 3. One version of a complete component embodying features of the invention is shown in FIG. 6 and identified by the reference character HXCI. Generally, as viewed in FIG. 3, the component comprises a side-by-side single layer array or warp of elongated flexible tube elements T formed of an organic polymeric composition, which tube elements are laterally joined together or physically united in at least one transversely extending integral structure MS. The tube elements are united by any suitable means, preferably a molding arrangement to be described at a later point. This integral structure is provided with elongated passageways P extending therethrough, each passageway communicating with the interior of a hollow tubular element T at at least one end of the integral or molded structure MS. The passageways in the integral structure have generally uniform transverse cross sections with four sides as shown. The opposed walls 10 which divide the integral structure laterally to form the passageways P are substantially parallel to each other and are generally planar. These walls 10 are joined or connected as shown in FIG. 3 by two opposed equidistant walls 11 which are faired together in a lateral direction to form opposing transversely extending regular surfaces constructed and arranged to engage and match with other similar structures of tubular elements, or with other portions of the same structure when folded or wound, so that a heat exchange bundle of a plurality of layers, as shown in FIGS. 7, 8, 10, 11, 12 and 13, can conveniently be assembled and formed. The preferred and simplest arrangement of fairing together the equidistant walls to provide the regular opposed surfaces suitable for forming multilayer arrangements is the one in which all of the opposed walls on one side of the molded structure are joined to form a single transversely extending planar surface as shown in FIG. 3. However, other arrangements may be formed and used such as those having transverse cross sections as shown in FIG. 9. The heat exchange bundles are formed by winding or stacking the assemblable components and suitably bonding these components together at least at the end portions where the tube elements are physically united to form the transversely extending integral molded structures.

Figure 8:
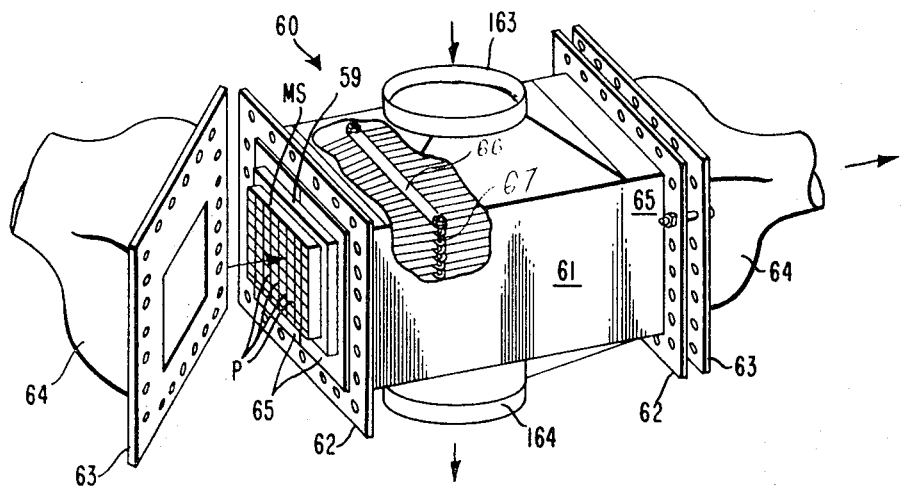
FIG. 8 is a partial simplified perspective view of an overall "cross flow" heat exchanger utilizing a rectangular transverse cross section assembly of components of this invention with certain parts broken away for a clearer general showing.

The component HXCI shown in FIG. 6 can be provided with a relatively rigid supporting framework, which may be a wire grid interwoven with the tube elements T. As shown the grid comprises transversely extending elements 56 which are interconnected at their end portions by longitudinal elements 55. The supporting framework is used where it is desired to maintain the flexible array of tube elements in a given position and for configuration. Another type of supporting framework is shown in FIG. 8 in which a tube bundle of rectangular transverse cross section is built up of a plurality of single layer arrays of tube elements or components of the invention. The framework of FIG. 8 comprises at a number of longitudinally spaced positions along the bundle of tube elements, a plurality of transversely extending members 66 each placed between a layer of tube elements and joined at their ends by elongated bolt members 67. If desired, the transversely extending members 66 may be further secured in place by an adhesive bond to the engaged layers of tube elements.

Another version of the assemblable component of the invention is disclosed in FIG. 10. These components are identical with the components shown in FIGS. 3 and 6 except that they are further provided intermediate their end portions with an additional transversely extending integral molded structure MSA formed by physically united tube elements for a purpose to be disclosed hereinafter.

The components embodying principles of the invention may be used individually as shown in FIG. 6 by suitably securing and sealing the transversely extending molded structures MS in openings 52, 54 in header members 51 and 53 respectively. The component of course may be used with and without a supporting framework. Header members 51 and 53 can conveniently be made of an organic polymeric composition compatible with the material of which the tube elements are formed.

Figure 7:
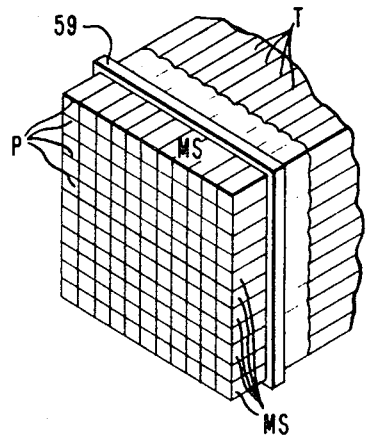
FIG. 7 is a partial perspective view of one end of a rectangular transverse cross section heat exchanger unit formed by assembling a plurality of components of this invention.

The components of the invention may be used in a multilayer stacked arrangement as shown in FIGS. 7 and 8. This arrangement is formed by stacking or superimposing one on the other a plurality of components such as those shown in FIGS. 3 and 6 and sealing or bonding the transversely extending integral molded structures MS to each other at each end of the stacked arrangement. When components of the same length and width are used in such an arrangement, a bundle of tube elements with a rectangular transverse cross section is formed as seen in FIG. 7. Usually a rigidly secured peripherally surrounding flange member 59 is provided at each end of the bundle to assist in its assembly into a complete heat exchanger apparatus of the type generally shown in FIG. 8. In FIG. 8, a bundle of tube elements of rectangular transverse cross section is positioned inside a casing member 61 with a corresponding transverse cross section. The bundle of tube elements shown in FIG. 8 has been provided with one form of a supporting framework as previously described. This tube bundle is mounted in position at each end of the casing member 61 by means of a split plates 65 which engage flange 62 around the end opening of the casing member 61 and fit closely around and engages one side of the flange member 59 around the end of the tube bundle.

Each end of the casing member 61 is provided with a header member 64 with flange 63. When the header member is assembled its flange 63 is fitted closely around the end of the tube bundle and engages the other side flange member 59 on the end of the bundle. When the flanges 62 and 63 are bolted together their clamping engagement with opposite sides of flange 59 forms an end closure for the apparatus and maintains the desired separation of the fluid passing through the tube elements from the fluid passing transversely through casing member 61 across the exteriors of the tube elements.

FIG. 10 discloses a heat exchange apparatus formed by assembling a plurality of components each of which comprise a transversely extending integral molded structure MS at each end of a single layer warp of tube elements and further comprises a transversely extending integral molded structure MSA formed by physically uniting the tube elements at a position intermediate the ends thereof. The molded structures intermediate the ends of the array of tube elements are provided with two opposed major surfaces which are planar and parallel. A plurality of components of this type are stacked as shown in FIG. 10 with alternate components having their integral molded structure MS at their end portions brought together in stacked arrangement, and suitably bonded to each other by adhesives or welding to form an end unit with a transverse cross section suitable for being received in, secured, and sealed in openings 72 in the header members 71 as shown. The opposing planer surfaces of the integral molded structure MSA intermediate the ends of the tube elements are maintained in operative heat transfer engagement with each other by means such as gravity or suitable bonding so that heat transfer occurs between a fluid passing through one component and a fluid passing through the adjacent components without the need for a surrounding casing or housing member.

The structure and functioning of the components, as well as the operation of the assembled multicomponent heat transfer units, or apparatus, is believed to be clear from the preceding description and the accompanying drawings.

Figure 5:
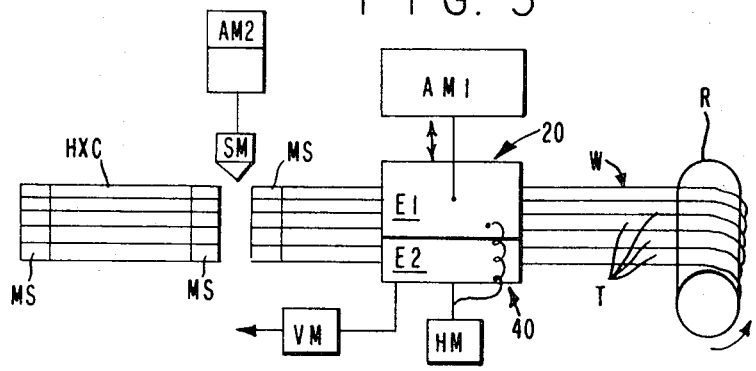
FIG. 5 is a general schematic showing of one overall arrangement for producing components suitable for heat exchange and embodying principles of the invention.

A preferred arrangement for manufacturing components of the invention is shown generally and schematically in FIG. 5. In this arrangement a single layer warp, or array, W of continuous tubular elements T is formed by unwinding them from a reel or drum R or other suitable supply means. The tubular elements T are constrained into a side-by-side laterally engaged layer an led through a zone occupied by a means E1, E2 for forming an airtight enclosure across at least a portion of the warp. A heating means 4M and a vacuum means VM are operatively associated with the means E1, E2 for applying heat to a portion of a warp which extends through the airtight enclosure of means E1, E2 and also applying a reduced pressure externally of the tube elements of the heated portion of the warp in order to physically unite the tubes of the portion and form the transversely extending integral molded structure MS. In this arrangement at least one end of the tube elements of the warp are open to the atmosphere in order to develop the desired pressure differential across the heated portion of the tubes in the airtight enclosure. After the molded structure MS has been formed the application of heat and differential pressure is terminated and the molded structure MS of the united warp is removed from enclosure means E1, E2 to a position at which the molded structure MS is engaged by a severing means JM to sever the molded structure transversely as indicated in FIG. 5 to form the component of the invention indicated by the reference characters HXC. The operation is repeated to produce the desired number of components.

The preferred composition of which the tubular elements are made and the preferred sizes of these elements are disclosed in the above-mentioned U.S. Pat. No. 3,228,456. The composition most preferred is a polyfluorinated plastic such as a copolymer of tetrafluoroethylene and hexafluoropropylene. The tubular elements in the bundle preferably are in a size range between about 5 and about 275 mils outside diameter with a wall thickness between about 0.5 and about 30.0 mils. Such tubular elements are usually quite flexible, especially at elevated operating temperatures.

However, it is believed to be clear to those of ordinary skill in the art involved that other materials could be utilized without departing from the spirit of the invention. Many other organic polymeric compositions could be used so long as they were thermoplastic, possessed suitable compatibility with the fluids handled, possessed adequate properties such as strength at the operating conditions of the apparatus, and further possessed adequate thermal conductivity for the intended use.

The preferred fluorinated plastic materials, especially for heat transfer applications involving corrosive fluids, may also conveniently be used to form other elements of the apparatus in addition to the tubular elements; for example, the peripheral flange 59 surrounding the bonded molded structures of the united components of FIG. 7, and the tubular header members as shown in FIGS. 6 and 10. These materials may be joined to each other conveniently by welding or heat bonding techniques in which the heat-softened or molten parts to be joined are held in engagement under suitable pressure, and allowed to cool in united condition. Techniques and arrangements are also known for operatively uniting plastic components as used in this invention with components of other materials such as metals. Some illustrative constructions and arrangements of this type are shown in the issued U.S. patents and pending patent applications referred to in the preceding portions of this specification.

Figure 1A:
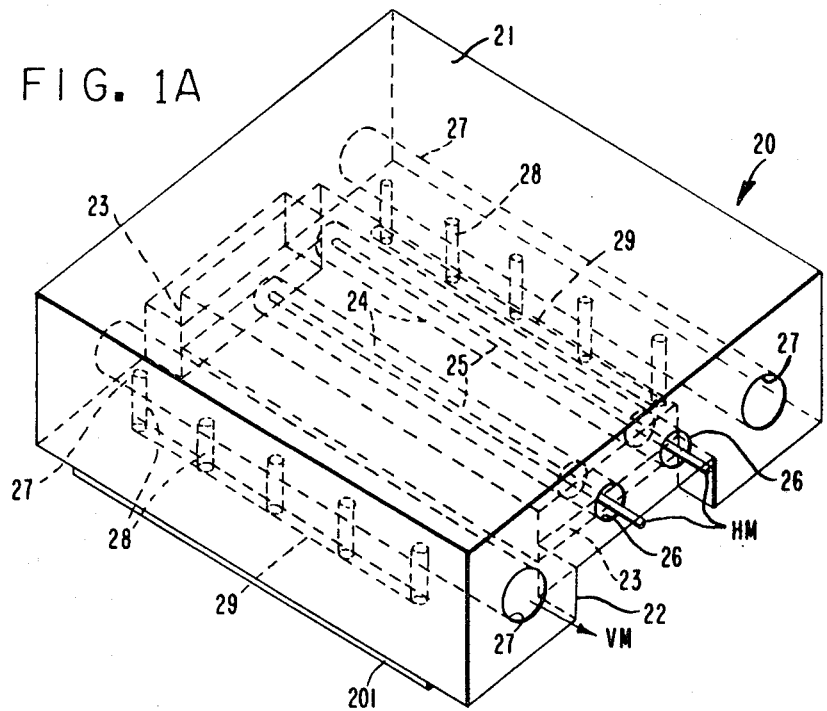
FIGS. 1A and 1B are perspective views of the main units of the apparatus for forming the improved component of this invention, by creating a tight enclosure around a warp of tube elements and applying the required heat and reduced pressure to the tube elements to physically unite them.
Figure 1B:
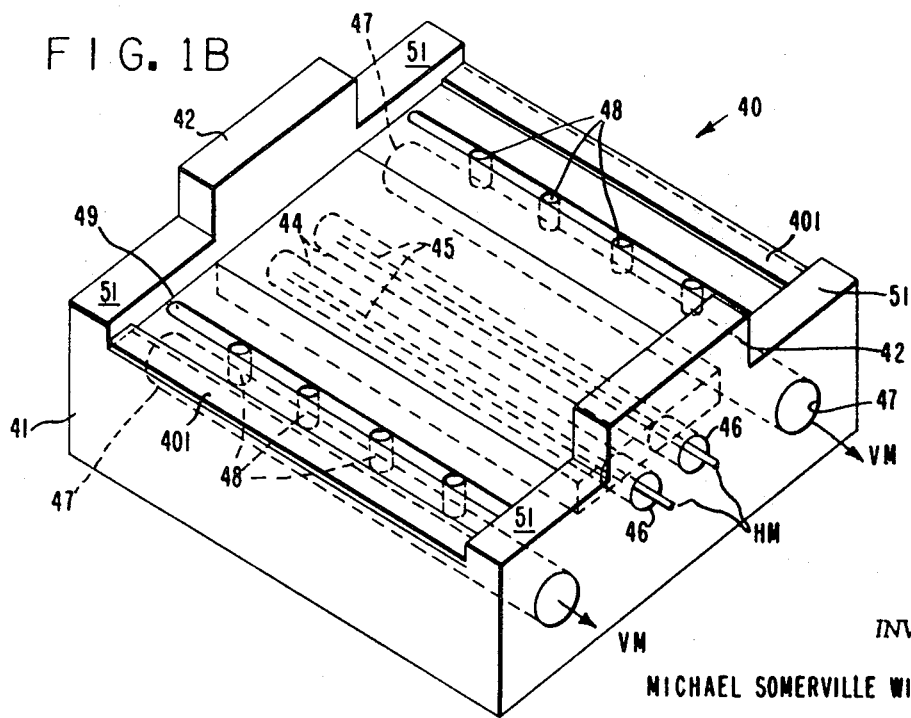

The details of one form of the means E1, E2 which forms the airtight enclosure around at least a portion of the flat array of tube elements are shown in FIGS. 1A and 1B. This means comprises an upper assembly 20 and a lower assembly 40 which are mounted for movement relative to each other between a first position in which the two assemblies engage each other and an array of tube elements to form the airtight enclosure around at least a portion of the array, and a second position in which the two assemblies are spaced apart for removal of the united array and entry of a new array for treatment. A suitable actuating means AM1 for effecting this relative movement is shown schematically in FIG. 5, and could be any of many conventional pneumatic, hydraulic, electrical, or mechanical actuating mechanisms. A suitable vacuum-producing means VM such as pump is operatively connected to the enclosure-forming means E1, E2 as shown in FIG. 5. Suitable means HM for heating the portion of an array of tube elements contained in the enclosure is also operatively associated with the enclosure and could be any suitable conventional heating arrangement such as electrical or circulating fluid or other type.

Figure 2:
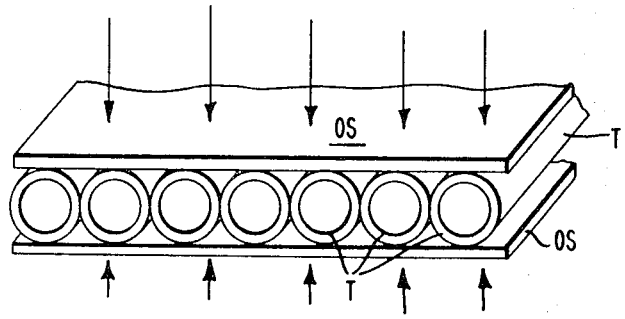
FIG. 2 is a partial perspective view of the terminal portions of a single layer parallel array of plastic tube elements positioned between two opposed heated surfaces as would occur in the units of FIGS. 1A and 1B to apply the heat and pressure to physically unite the tube elements to form the component of this invention.
Figure 4:
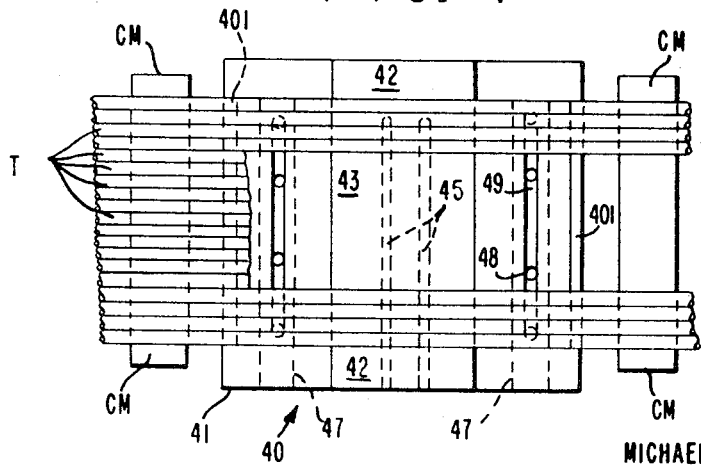
FIG. 4 is a partial plan view of the apparatus unit of FIG. 1B showing a warp or array of tube elements positioned therein prior to the uniting operation.

Referring again to FIGS. 1A and 1B each assembly 20, 40 comprises a main block or structural unit 21, 41 in which are provided suitable passageways for applying the vacuum or reduced pressure to the exterior of tube elements of a warp portion enclosed by said assemblies. In addition, two opposed surfaces for applying a clamping force to the tube element of an enclosed warp tending to flatten the tube elements and move the engaged portions of the tube elements into firm lateral engagement, and warp heating means cooperating with said opposed surfaces are provided in these assemblies. Specifically, referring to FIG. 1B, the vacuum passageways comprise two elongated transversely extending cylindrical passageways 47 extending across the unit 41, each passageway communicating with a parallel groove 49 through a number of short passageways 48 spaced along the length of the groove and the elongated passageways. Passageways 47 are adapted by conventional means to be operatively connected to a vacuum pump or other pressure reducing means by suitable conduits and connections not shown. As shown in FIG. 1B a flat surface 43 is provided in unit or block 41. This surface corresponds to a similar opposed surface 23 in unit or block 21 so that when the two assemblies are positioned in engagement about a layer or warp of tube elements, these surfaces carry out the above-mentioned clamping action on the engaged elements. FIG. 4 illustrates the lower assembly 40 in a plan view with a warp or array of tube elements positioned therein prior to engagement with the upper assembly 20. In FIG. 1B two parallel transversely extending recesses 44 are shown with openings 46 at the side of the unit. These recesses are positioned adjacent to surface 43 for controlled distribution of heat to the surface 43 from cartridge type electrical resistance heaters positioned in each recess. These heaters are connected to a suitable source of power and control unit by means of suitable connections not shown. Lower unit 41 is provided with opposed sidewalls 51 each having a portion 42 extending therefrom. These sidewalls define a space for receiving an array or warp of tube elements as shown in FIG. 4, and cooperate with corresponding sidewalls on the upper unit 21 to form the airtight enclosure around a warp when the two units are brought together into engagement with each others and the warp. It will be clear from FIGS. 1A and 1B that the upper unit 21 is similar in features and function to lower unit 41 just described. When the units or assemblies are engaged about a portion of a tube array, opposed resilient sealing strips 401 and 201 at each end of the units engage the tube elements to form an airtight seal about the tube elements. The elements indicated at CM in FIG. 4 are lateral guide or positioning means for constraining a warp of tube elements into a close side-by-side arrangement prior to formation of the transversely extending integral molded structure MS. FIG. 2 illustrates the clamping action of the opposed surfaces OS (43, 23, of units 41, 21) on the tubes of a warp engaged between assemblies 20 and 40. Units 21 and 41 are preferably made of a strong insulating thermoset plastic material except for the opposed clamping surfaces which preferably are found of metal in order to perform their heat transfer function effectively.

In operation, an array of tube elements with at least one end of each of the tube elements open to atmospheric pressure is placed in position on lower unit 41 as shown in FIG. 4, and the upper and lower units are brought together into engagement with each other and the array to form the airtight enclosure about the engaged portion of the warp. The pressure is then reduced inside the enclosure and exteriorly of the tube elements by means of passageways 47, 48, 27, 28; grooves 29, 49; and vacuum means VM while the portions of the elements engaged by the opposed clamping surfaces 23, 43 are being heated by heater units 45, 25. When the required combination of heat and pressure differential across the tube element walls is reached the tube elements between the clamping surfaces 23, 43 are united and molded to form the transversely extending integral structure MS is shown in FIG. 3, after which the heat and pressure differential are terminated, the structure allowed to cool, the assemblies 20, 40 moved to their spaced-apart positions, and the structure removed therefrom. With the preferred tube element material (copolymer of TFE and HEP) and tube element dimensions of 80 mils outside diameter and 8 mils wall thickness, a vacuum of 12 to 18 inches of water and heating the tube elements to about 285° C. are sufficient to form satisfactory molded structures. It is possible to remove such structures from the assemblies 20, 40 after they have cooled about 250° C. in order to shorten the cycle of operation.

If desired, a stronger more rigid molded structure can be formed if a transversely extending flat strip of material of the same or similar composition as the tube elements is placed between each of the opposed surfaces 23, 43 and the tube array in an arrangement similar to that of FIG. 2 where the elements indicated at OS would represent the flat strips. These strips become a part of the integral molded structure MS under the heat and pressure differential applied within the engaged assemblies 20 and 40 during operation.

The molded structures MS of the components can be joined together to form a tube bundle, one end of one version being shown in FIG. 7. The components are joined together by heating the opposed surfaces to a softened bondable condition and applying pressure to hold and unite the components to each other. Another method of joining the molded structures at the ends of stacked or wound components to form a tube element bundle involves the use of a special composite bonding or fusing tape or sheet comprising a thin film of tetrafluoroethylene rendered electrically conductive by having carbon or other conducting particles dispersed therein, this film being positioned between two adherent thin layers of the same material as that forming the tube elements. The composite sheet or tape is positioned between opposing surfaces of two molded structures under light pressure and sufficient electric current passed through the composite tape or sheet to cause fusion and bonding of the opposed surfaces to the composite tape and each other. This can be accomplished in stacked arrangements of components similar to that shown in FIG. 7 and in wound arrangements similar to that shown in FIG. 11.

FIG. 11 schematically represents another version of an arrangement for forming the transversely extended molded structures on a warp of tube elements. In this version, the molded structure is progressively formed, either in steps or continuously, transversely across a single layer warp of tube elements. Airtight enclosure means E1, E2 operate at each end of the warp and if desired, one or more of these means could operate to form molded structures at positions intermediate the ends as shown. The component formed by this arrangement would be of indefinite width or transverse dimension, and could be used to form composite tube element bundles for heat exchange units either by (1) severing the united warp along a line parallel to the tube elements, stacking, and bonding such severed components to form the bundle; or (2) winding up and bonding the single component of indefinite length as illustrated in FIG. 11. In FIG. 11 the bonding means BM is shown at each end of the warp being wound and heats the transversely extending molded structure surfaces so that they will fuse together under the pressure in the wound unit. The heating accomplished by the means BM also causes the structures MS to be more easily wound up due to their softened condition. Considerable care must be taken to control the dimensions of the molded structure MS relative to the dimensions of the tube elements in order to ensure winding up the final bundle in a uniform manner. In FIG. 11 the staggered short length molded structures intermediate the ends of the bundle can be used to help stabilize the bundle configuration and, if desired, act as baffle arrangements in certain installations.

FIGS. 12 and 13 illustrate other forms that a wound-up bundle might take, depending on the transverse cross section of the windup mandrel which may or may not remain in the bundle in its final form.

It is believed to be clear that applicant has provided a novel and improved component for heat transfer in accordance with the objects of the invention. A need has been established, both in new design equipment and in modifications of conventional heat transfer apparatus, for special configuration components greatly reduced in one of their three dimensions. An example of this, in addition to those already disclosed, occurs where it is desired to position new heat transfer components or tube bundles between banks of existing tubes to increase heat transfer capabilities. Another end use particularly fitted to the single layer components of this invention is the tracing of conduits and tanks with flexible bundles of indefinite length.

Although preferred embodiments of the invention have been described in detail in accordance with the Patent Statute, many other modifications and variations within the spirit of the invention will occur to those skilled in this art and all such art are considered to fall within the terms of the following claims.

I claim:

1. A method of fabricating heat exchange components, said method comprising in combination the steps of: forming a single layer warp of a plurality of parallel side-by-side continuous flexible hollow tubes made of an organic polymeric composition, at least one end of said tubes being open to the atmosphere; at a given position along said warp constraining said warp laterally so that said tubes engage each other laterally; forming an airtight enclosure about at least a portion of said warp at said given position; applying a clamping force to said tubes in said position across the width of said warp tending to flatten the tubes and move the engaged portions of the tubes into further engagement with each other; while maintaining such pressure, heating the tubes at said position in said enclosure to above the softening point of the polymeric material; concurrently reducing the pressure inside the enclosure and outside of said tubes sufficiently relative to the degree of heating of the tubes to expand the tubes into bonding engagement with each other terminating application of said clamping force; and removing said warp from said enclosure.

2. The method of claim 1 which further comprises winding said warp about an axis substantially parallel to said tube elements to form a multilayer assembly and bonding adjacent layers of said assembly together.

3. A method of fabricating heat exchange components, said method comprising in combination the steps of: forming a single layer warp of a plurality of parallel side-by-side continuous flexible hollow tubes made of an organic polymeric composition, at least one end of said tubes being open to the atmosphere; at a given position along said warp; constraining said warp laterally so that said tubes engage each other laterally; forming an airtight enclosure about at least a portion of said warp at said given position; applying a clamping force to said tubes in said position across the width of said warp tending to flatten the tubes and move the engaged portions of the tubes into further engagement with each other; while maintaining such pressure, heating the tubes at said position in said enclosure to above the softening point of the polymeric material; concurrently reducing the pressure inside the enclosure and outside of said tubes sufficiently relative to the degree of heating of the tubes to expand the tubes into bonding engagement with each other opening said enclosure; severing said warp transversely along a line within the region where said tubes are bonded together; constraining the warp at another position along one of the severed portions of the warp; and, at the new position, repeating the above procedure from the formation of an air tight enclosure about the warp.

4. The method of claim 3 which further comprises positioning surfaces of said warp in engagement with each other in a multilayer arrangement, and between at least a portion of the engaged surfaces positioning a tape member of organic polymeric composition having sufficient electrically conductive particles dispersed therein to render it capable of conducting electrical current, maintaining light pressure tending to hold said surfaces in engagement with each other and said tape member, and passing sufficient current through said tape member to partially fuse the surfaces and said tape member and bond then together into a single unit.

5. A method of fabricating heat exchange components, said method comprising in combination the steps of: forming a single layer warp of a plurality or parallel side-by-side continuous flexible hollow tubes made of an organic polymeric composition; at a given position along said warp constraining said warp laterally so that said tubes engage each other laterally; applying a clamping force to said tubes in said position across the width of said warp tending to flatten the tubes and move the engaged portions of the tubes into further engagement with each other; while maintaining such pressure, heating the tubes at said position to above the softening point of the polymeric material; concurrently applying a sufficient pressure differential across said tube walls relative to the degree of heating of the tubes to expand the tubes into bonding engagement with each other terminating application of said clamping force; and removing said warp from said given position.

* * * * *